Figure 1:
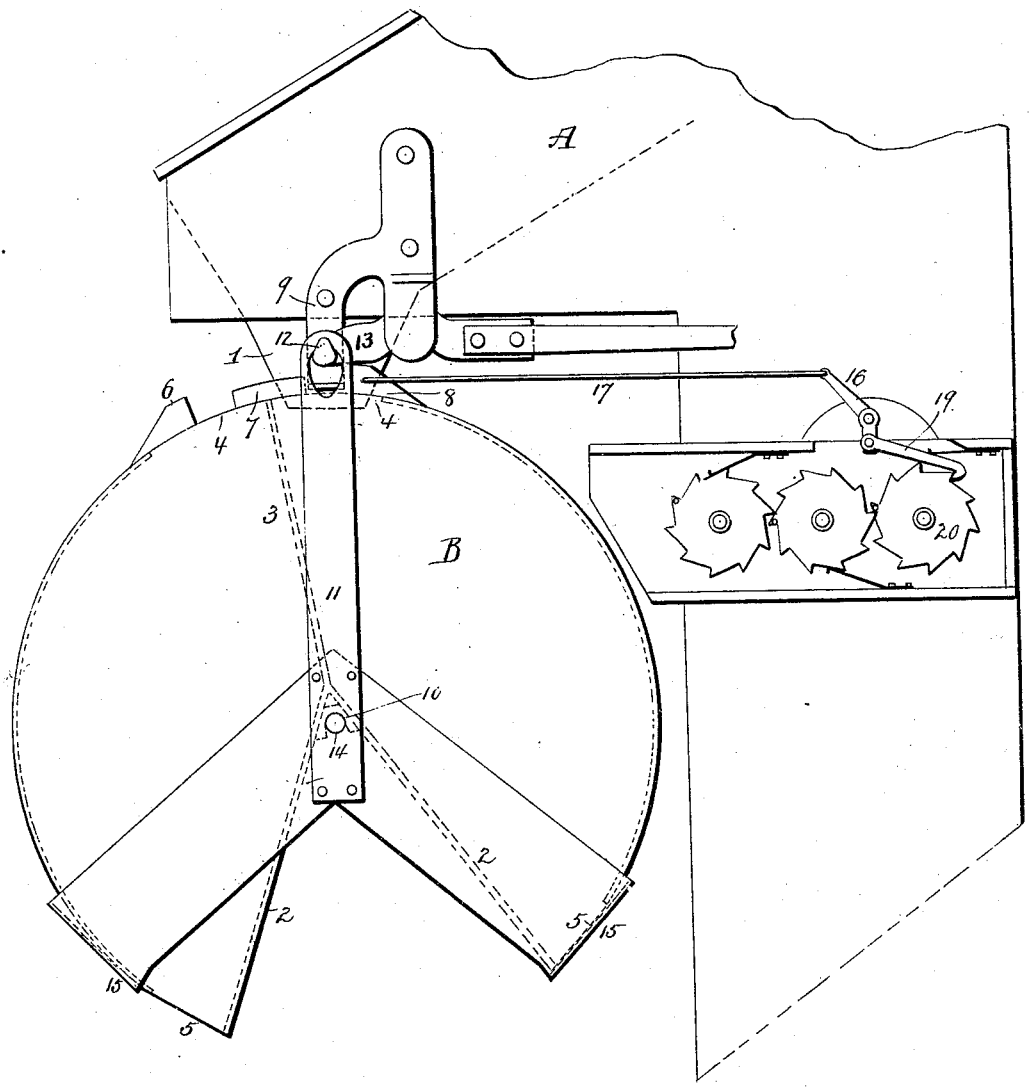

(No Model.) 2 Sheets—Sheet 1.

E. HUBER & J. W. MILLER.
GRAIN WEIGHER.

No. 556,149. Patented Mar. 10, 1896.

Witnesses
E. J. Nottingham
G. F. Downing

Inventors
E. Huber and
J. W. Miller
By M. D. Leggett & Co.
Attorneys

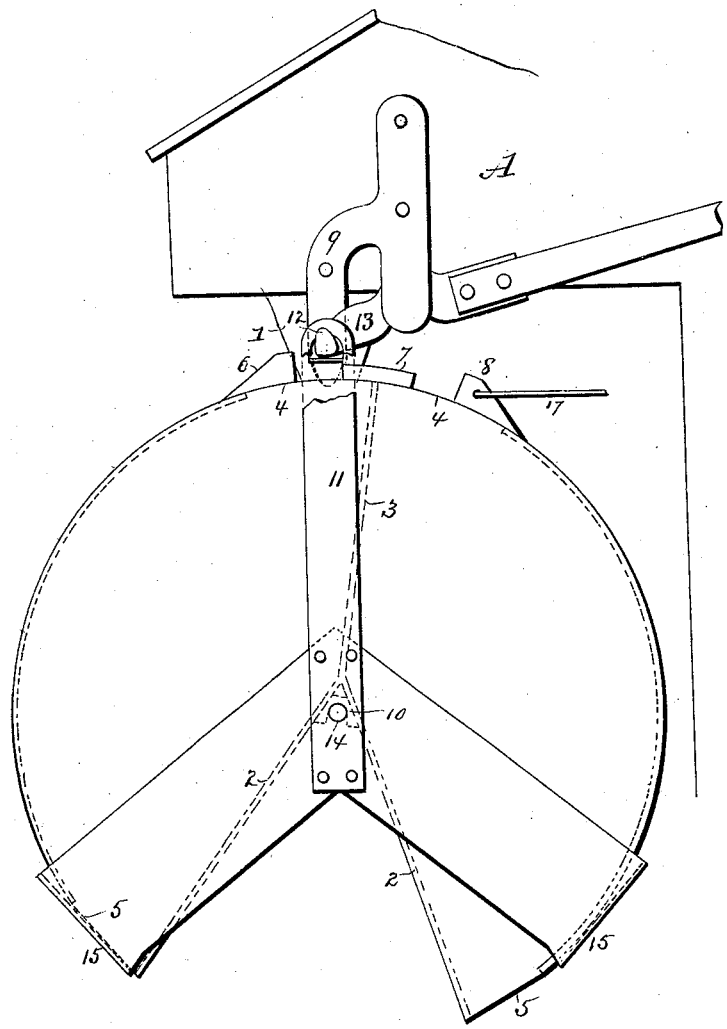

UNITED STATES PATENT OFFICE.

EDWARD HUBER AND JACOB W. MILLER, OF MARION, OHIO.

GRAIN-WEIGHER.

SPECIFICATION forming part of Letters Patent No. 556,149, dated March 10, 1896.

Application filed August 26, 1895. Serial No. 560,566. (No model.)

*To all whom it may concern:*

Be it known that we, EDWARD HUBER and JACOB W. MILLER, of Marion, in the county of Marion and State of Ohio, have invented certain new and useful Improvements in Grain-Weighers; and we do hereby declare the following to be a full, clear, and exact description of the invention, such as will enable others skilled in the art to which it appertains to make and use the same.

Our invention relates to an improvement in grain-weighers, the object being to provide a machine which may be easily made, taken apart, or put together, as occasion may require.

A further object is to provide an improved lock-and-stop mechanism and an improved register.

With these objects in view the invention consists in an oscillatory drum divided into two parts and detachably mounted on a journal on the frame of the machine arranged to receive it, and, further, it consists in certain novel features of construction and combinations of parts, which will be hereinafter described, and pointed out in the claims.

In the accompanying drawings, Figures 1 and 2 are views in side elevation showing the two extreme positions of the drum.

A represents a frame provided with a grain-spout 1, through which the grain discharges into the weighing-drum beneath. B indicates cates this drum, the general form being cylindrical, with a segment removed, whereby the two inclining bottoms 2 2 are formed, which radiate from the axial center of the drum; also, the drum is furnished with a partition 3, which extends upward from this axial center of the drum to the top, dividing it into two compartments. Openings 4 4 are formed in the upper ends of these compartments for the reception of grain, and similar ones are formed at the bottom at 5 5 for the discharge of the grain. On top of the drum the stops 6, 7, and 8 are formed, and a depending arm 9 from the frame is adapted to enter between two of these stops, according to the position of the drum, which will be more fully explained. The drum is provided with bearings 10 10, located in the crotch thereof.

A swing 11 is hung by means of the usual knife-edged bearings 12 12 from the short arm of the scale-beam 13. The drum is removably supported in this swing, its lower ends straddling the journal 14 and the bearings 10 10 resting and turning thereon. Depending from this swing are the doors or cut-offs 15 15. These are fixed in position, and as the drum oscillates they are in such relation thereto that the discharge-opening in the uppermost compartment is always closed and that of the other compartment is open; also, it will be observed that the compartment which is closed at the bottom is in position to receive the discharging grain from the spout, and the other one is simultaneously discharging its contents through its open bottom.

In Fig. 1 the drum is locked, one drum is being filled and the other is emptying. When now the weight in the drum being filled is sufficient to tip the scale-beam, the drum descends sufficiently so that the stop 7 clears the arm 9, and the preponderating weight of the compartment just filled causes the drum to quickly rock on the journal 14 to the other position which it has not quite reached, as illustrated in Fig. 2. When it does reach this point, enough grain has escaped at the lower end of the discharging-compartment to permit the drum to rise and the scale-beam to descend, allowing arm 9 to enter the notch between stops 6 and 7, where it remains until the other compartment is filled, when the operation repeats itself automatically.

It may be mentioned that the stops 6 and 8 are high enough so that they never descend below the lower end of arm 9 with the slight descent of the drum; but they always serve as effectual stops to limit the movement of the drums.

In addition to the weighing apparatus a simple means for operating a register is shown. This consists of a rock-lever 16, fulcrumed at or near the center, and a link 17, pivotally connected with one end of the rock-lever and its other end extending to the drum to which it is pivoted, and a pawl 19, connected to the opposite end of the rock-lever, operates in connection with the teeth of a ratchet-toothed wheel 20, which operates the register. With each movement of the drum in one direction the wheel is turned the distance of one tooth, the alternate stroke placing the pawl in position to engage another tooth, and so on.

Some slight modifications might be described, but it is evident they could be made without departure from the spirit and scope of the invention, and hence we do not wish to limit ourselves to the exact construction herein set forth; but, Having fully described our invention, what we claim as new, and desire to secure by Letters Patent, is—

1. In a grain-weigher the combination with a scale-beam, and a swing hung thereon, said swing having a journal at the lower end, of a drum arranged to straddle the journal and oscillate thereon, substantially as set forth.

2. In a grain-weigher, the combination with a swing, of a drum having a notch therein said notch arranged to receive a portion of the swing and having bearings which rock thereon, substantially as set forth.

In testimony whereof we have signed this specification in the presence of two subscribing witnesses.

EDWARD HUBER.
JACOB W. MILLER.

Witnesses:
JOHN J. CRAWLEY,
JOHN A. SCHROELER.